United States Patent
Jost et al.

(10) Patent No.: US 11,321,974 B2
(45) Date of Patent: May 3, 2022

(54) METHOD AND SYSTEM FOR CARRYING OUT AN ON-BOARD DIAGNOSTIC FUNCTION OF A VEHICLE

(71) Applicant: Dr. Ing. h.c. F. Porsche Aktiengesellschaft, Stuttgart (DE)

(72) Inventors: Philip Jost, Stuttgart (DE); Thomas Melzig, Leonberg (DE); Markus Reiber, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 192 days.

(21) Appl. No.: 16/515,183

(22) Filed: Jul. 18, 2019

(65) Prior Publication Data

US 2020/0027289 A1    Jan. 23, 2020

(30) Foreign Application Priority Data

Jul. 20, 2018 (DE) ..................... 10 2018 117 623.6

(51) Int. Cl.
*G07C 5/08* (2006.01)
*B60W 30/02* (2012.01)

(52) U.S. Cl.
CPC ......... *G07C 5/0808* (2013.01); *B60W 30/025* (2013.01); *G07C 5/085* (2013.01)

(58) Field of Classification Search
CPC .................................................. G07C 5/0808
See application file for complete search history.

(56) References Cited

U.S. PATENT DOCUMENTS

| | | | |
|---|---|---|---|
| 7,027,904 B2 * | 4/2006 | Ishizu | B60W 10/04 701/93 |
| 8,091,342 B2 * | 1/2012 | Perry | F01N 3/2073 60/286 |
| 8,332,123 B2 * | 12/2012 | Miersch-Wiemers | F02D 41/221 701/102 |
| 9,791,041 B2 * | 10/2017 | Jeong | F16H 61/06 |
| 9,821,804 B2 * | 11/2017 | D'Amato | B60W 50/087 |
| 2003/0060961 A1 | 3/2003 | Ishizu et al. | |
| 2010/0186390 A1 | 7/2010 | Perry et al. | |
| 2016/0096526 A1 | 4/2016 | D Amato et al. | |
| 2017/0045138 A1 | 2/2017 | Jeong et al. | |
| 2020/0027289 A1 * | 1/2020 | Jost | F02D 11/105 |

FOREIGN PATENT DOCUMENTS

| | | |
|---|---|---|
| DE | 102005059689 A1 | 7/2007 |
| DE | 60223215 T2 | 8/2008 |
| DE | 102010005646 B4 | 7/2015 |
| DE | 102015116479 A1 | 4/2016 |
| DE | 102015120499 A1 | 2/2017 |

* cited by examiner

Primary Examiner — Michael A Berns
(74) Attorney, Agent, or Firm — Leydig, Voit & Mayer, Ltd.

(57) ABSTRACT

A method for carrying out an on-board diagnostic function of a vehicle includes activating an on-board diagnostic function of the vehicle and subjecting a predefined gas pedal value of the vehicle to low-pass filtering in order to obtain a smoothed gas pedal value.

14 Claims, 2 Drawing Sheets

METHOD AND SYSTEM FOR CARRYING OUT AN ON-BOARD DIAGNOSTIC FUNCTION OF A VEHICLE

CROSS REFERENCE TO RELATED APPLICATIONS

This application claims benefit to German Patent Application No. DE 10 2018 117 623.6, filed Jul. 20, 2018, which is hereby incorporated by reference herein.

FIELD

The invention relates to a method and a system for carrying out an on-board diagnostic function of a vehicle.

BACKGROUND

In vehicles, in particular vehicles with an internal combustion engine, on-board diagnostic functions (OBD) are used to monitor the function of the vehicle, in particular of the internal combustion engine and/or of other systems influencing the exhaust gas, during operation of the vehicle. Fault states can be detected and displayed in this case.

Some on-board diagnostic functions can be carried out only in driving situations with low dynamics of the engine speed and/or of the air mass flow. A dynamic driving mode can therefore result in the on-board diagnostic functions not being carried out with sufficient frequency or not providing reliable results. In this respect, the availability of the on-board diagnostic functions is impaired in the case of a dynamic driving mode.

SUMMARY

In an embodiment, the present invention provides a method for carrying out an on-board diagnostic function of a vehicle. The method includes activating an on-board diagnostic function of the vehicle and subjecting a predefined gas pedal value of the vehicle to low-pass filtering to obtain a smoothed gas pedal value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
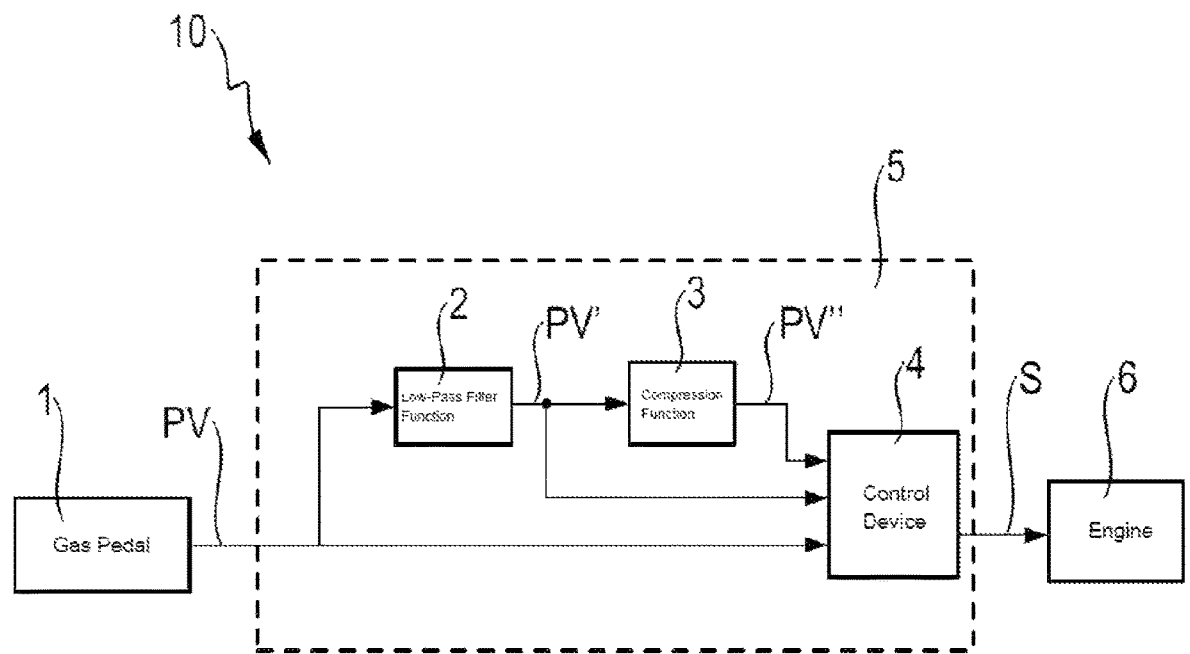
FIG. 1 shows a schematic block diagram of an exemplary embodiment of a system according to an embodiment of the invention for carrying out an on-board diagnostic function.

Against this background, embodiments of the invention increase the availability of on-board diagnostic functions in the case of a dynamic driving mode.

According to the invention, a method for carrying out an on-board diagnostic function of a vehicle is proposed, wherein an on-board diagnostic function of the vehicle is activated and a predefined gas pedal value of the vehicle is subjected to low-pass filtering in order to obtain a smoothed gas pedal value.

In the case of a dynamic driving mode, severe and/or frequent changes in the gas pedal value predefined via a position of a gas pedal usually occur. In the method according to the invention, a smoothed gas pedal value is generated when the on-board diagnostic function is activated by subjecting the gas pedal value predefined by the driver to low-pass filtering. The use of the smoothed gas pedal value results in reduced dynamics of the engine speed and/or of the air mass flow, as a result of which the on-board diagnostic function can be carried out with increased reliability. Consequently, the method according to the invention increases the availability of the on-board diagnostic function during dynamic driving with the vehicle.

The vehicle preferably has an internal combustion engine and the speed of the internal combustion engine is set on the basis of the smoothed gas pedal value. The load control of the internal combustion engine can be carried out using a control device which is supplied with the smoothed gas pedal value, at least when the on-board diagnostic function is activated. The engine speed and/or the supplied air mass flow is/are preferably set using the control device.

According to one advantageous configuration of the invention, the predefined gas pedal value of the vehicle is subjected to low-pass filtering either by means of a first low-pass filter function or by means of a second low-pass filter function depending on a sign of the gradient of the predefined gas pedal value. In this respect, an increase in the gas pedal value can be filtered using a different low-pass filter function than is used for a decrease in the gas pedal value.

In this context, it has proved to be advantageous if low-pass filtering is carried out by means of the first low-pass filter function if the gradient has a positive sign and otherwise low-pass filtering is carried out by means of the second low-pass filter function, wherein the first low-pass filter function effects greater smoothing of the smoothed gas pedal value with respect to the predefined gas pedal value than the second low-pass filter function. In the case of such a configuration of the method, a decrease in the gas pedal value is smoothed to a lesser extent than an increase in the gas pedal value, as a result of which a driving experience which is more pleasant for the driver can be produced. Alternatively, it is possible for low-pass filtering to be carried out by means of the first low-pass filter function if the gradient has a negative sign and otherwise for low-pass filtering to be carried out by means of the second low-pass filter function, wherein the first low-pass filter function effects greater smoothing of the smoothed gas pedal value with respect to the predefined gas pedal value than the second low-pass filter function. In the case of such a configuration of the method, an increase in the gas pedal value is smoothed to a lesser extent than a decrease in the gas pedal value.

A configuration has proved to be advantageous in which the predefined gas pedal value or the smoothed gas pedal value is supplied as an input value to a compression function in order to additionally make it possible to compress the predefined gas pedal value or the smoothed gas pedal value. The compression function can multiply the ratio of the input value to an initial value by a compression factor of less than 1. The predefined gas pedal value or the smoothed gas pedal value of the time at which the compression function was activated can be used as the initial value. This ensures a continuous transition upon the activation of the compression function.

According to one advantageous configuration, the on-board diagnostic function of the vehicle is activated if the predefined gas pedal value is within a predefined pedal value range, and/or if the on-board diagnostic function has not yet been carried out or the last time the on-board diagnostic function was carried out is in the past by more than a predefined period.

There may be a requirement for further switch-on conditions to be additionally met before the on-board diagnostic function of the vehicle is activated.

A configuration has proved to be advantageous in which the on-board diagnostic function is deactivated and, after the deactivation, the speed of the internal combustion engine is set on the basis of the smoothed gas pedal value until a first time, the speed of the internal combustion engine is set on the basis of the predefined gas pedal value after a second time, and the speed of the internal combustion engine is set on the basis of a transfer function in the time range between the first time and the second time.

In this context, it is particularly advantageous if the transfer function is a linear function, with the result that a ramp-like profile of the gas pedal value needed to set the speed of the internal combustion engine is obtained upon the deactivation of the on-board diagnostic function.

The on-board diagnostic function is preferably a catalytic converter diagnostic function or a cylinder imbalance diagnostic function or a tank venting valve diagnostic function or a variable valve stroke diagnostic function or a lambda adaptation diagnostic function.

According to the invention, a system is provided for carrying out an on-board diagnostic function in a vehicle having a control unit which is configured in such a manner that an on-board diagnostic function of the vehicle is activated and a low-pass filter function is activated and is used to subject a predefined gas pedal value of the vehicle to low-pass filtering in order to obtain a smoothed gas pedal value.

The same advantages as have already been described in connection with the method according to the invention can be achieved in the system.

In addition, the advantageous configurations and features discussed with respect to the method can also be used in the system.

FIG. 1 illustrates a system 10 for carrying out an on-board diagnostic function in a vehicle. The system 10 has a gas pedal 1 which is operated by a driver of the vehicle. On the basis of its position, the gas pedal 1 generates a gas pedal value PV which is supplied to a control unit 5 of the vehicle. On the basis of the gas pedal value PV, the control unit generates a control signal S for controlling an internal combustion engine 6 of the vehicle, for example for setting the speed and/or the torque of the internal combustion engine 6.

Some on-board diagnostic functions of the vehicle, for example a catalytic converter diagnostic function or a cylinder imbalance diagnostic function or a tank venting valve diagnostic function or a variable valve stroke diagnostic function or a lambda adaptation diagnostic function, can be carried out only in driving situations with low dynamics of the engine speed and/or of the air mass flow. In order to increase the availability of these on-board diagnostic functions, the control unit 5 is configured in such a manner that an on-board diagnostic function of the vehicle is activated and a low-pass filter function 2 is activated and is used to subject a predefined gas pedal value PV of the vehicle to low-pass filtering in order to obtain a smoothed gas pedal value PV'.

The control unit 5 has a control device 4, via which the gas pedal value PV predefined via the gas pedal 1 or the smoothed gas pedal value PV' is selectively used to generate the control signal S for the internal combustion engine 6. If the on-board diagnostic function of the vehicle is not activated, the control signal S is generated solely on the basis of the predefined gas pedal value PV. In contrast, if the on-board diagnostic function of the vehicle is activated, the smoothed gas pedal value PV' is used to generate the control signal S. Optionally, provision may be made for the smoothed gas pedal value PV' to be supplied to a compression function 3 in order to additionally compress the smoothed gas pedal value PV' and obtain a compressed smoothed gas pedal value PV''.

The on-board diagnostic function can be activated when the predefined gas pedal value PV is within a predefined pedal value range and/or when the on-board diagnostic function has not yet been carried out or when the last time the on-board diagnostic function was carried out is in the past by more than a predefined period. There may be a requirement for further switch-on conditions to be additionally met before the on-board diagnostic function of the vehicle is activated.

The details of the low-pass filter function 2 and of the compression function 3 shall be discussed below with the aid of the illustrations in FIGS. 2 and 3.

Figure 2:
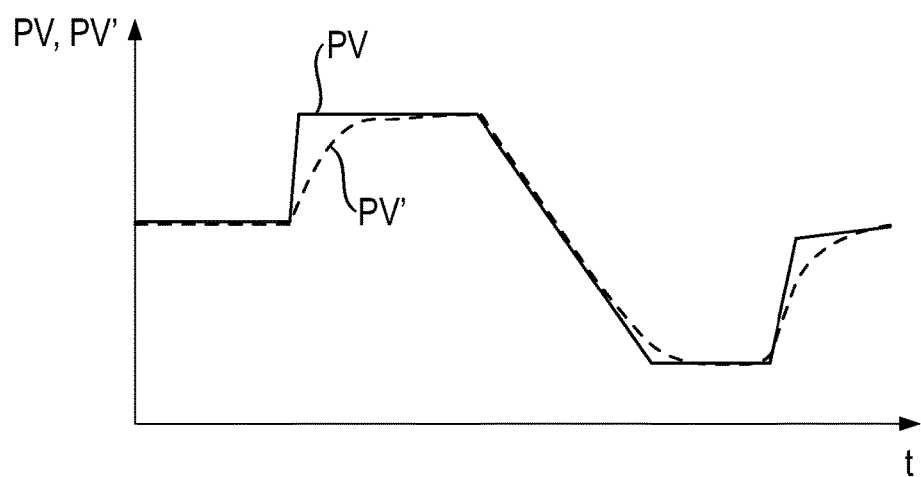
FIG. 2 shows exemplary profiles of a predefined gas pedal value and of a smoothed gas pedal value for illustrating a method according to an embodiment of the invention.

FIG. 2 shows exemplary profiles of the predefined gas pedal value PV and of a smoothed gas pedal value PV' over time t, wherein the smoothed gas pedal value PV' is obtained by subjecting the predefined gas pedal value PV to low-pass filtering. It is clear that gradients are limited in the smoothed gas pedal value PV' and step-like profiles are smoothed.

Optionally, the predefined gas pedal value PV of the vehicle can be subjected to low-pass filtering either by means of a first low-pass filter function or by means of a second low-pass filter function depending on a sign of the gradient of the predefined gas pedal value PV. For example, low-pass filtering can be carried out by means of the first low-pass filter function if the gradient has a positive sign and otherwise low-pass filtering can be carried out by means of the second low-pass filter function, wherein the first low-pass filter function effects greater smoothing of the smoothed gas pedal value PV' with respect to the predefined gas pedal value PV than the second low-pass filter function.

Figure 3:
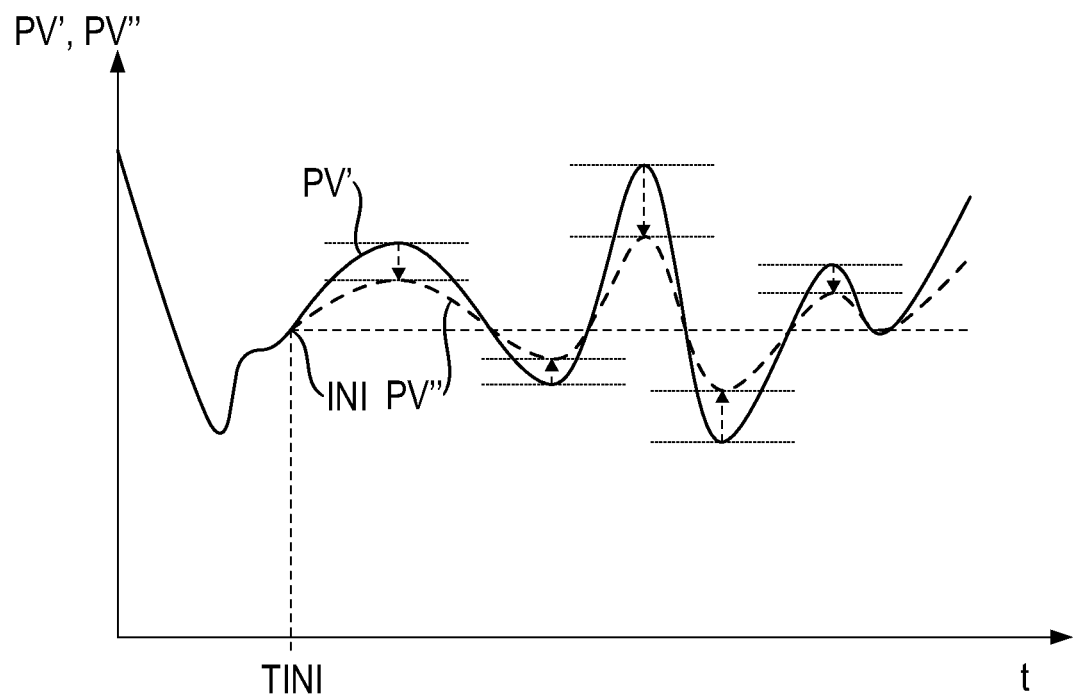
FIG. 3 shows exemplary profiles of a smoothed gas pedal value and of a smoothed compressed gas pedal value for illustrating a method according to an embodiment of the invention.

FIG. 3 illustrates exemplary profiles of a smoothed gas pedal value PV' and of a smoothed compressed gas pedal value PV'' over time t. The smoothed gas pedal value PV' is—as shown in FIG. 1—supplied to a compression function 3 as an input value. The compression function 3 multiplies the ratio of the input value PV' to an initial value I by a compression factor of less than 1. The smoothed gas pedal value PV' of the time TINI at which the compression function 3 was activated is used as the initial value INI. This achieves a continuous transition upon activation of the compression function 3.

Figure 4:
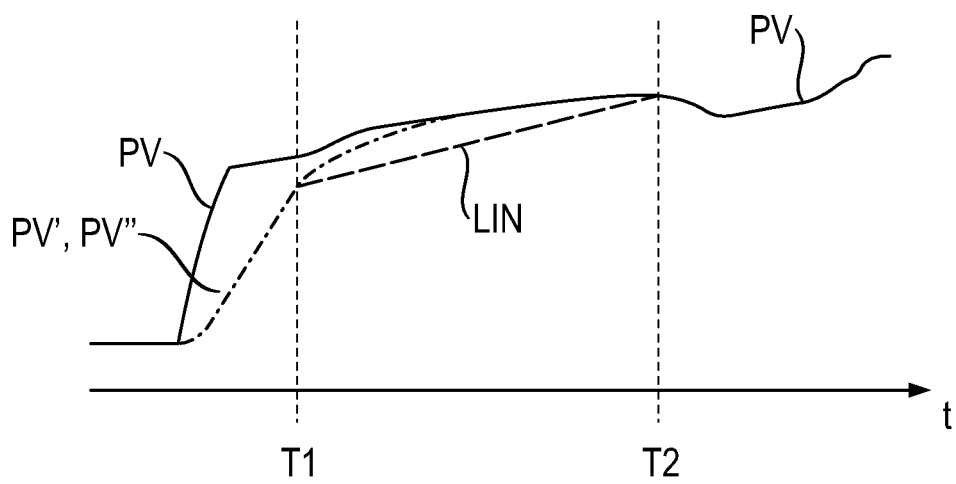
FIG. 4 shows an exemplary profile of a gas pedal value supplied to a control device upon deactivation of the on-board diagnostic function.

FIG. 4 shows exemplary profiles of the gas pedal values PV, PV' and PV'' used to control the internal combustion engine 6 upon deactivation of the on-board diagnostic function at a first time T1. In this case, the speed of the internal combustion engine 6 is set on the basis of the smoothed gas pedal value PV', in particular the compressed smoothed gas pedal value PV", until the first time T1. The speed of the internal combustion engine 6 is set on the basis of the predefined gas pedal value PV after a second time T2. The speed of the internal combustion engine 6 is set on the basis of a linear transfer function LIN in the time range between the first time T1 and the second time T2 in order to avoid an abrupt jump from the smoothed gas pedal value PV' to the gas pedal value PV predefined by the gas pedal 1 upon deactivation of the on-board diagnostic function.

A method for carrying out an on-board diagnostic function of the vehicle is used in the vehicle described above, wherein an on-board diagnostic function of the vehicle is activated and a predefined gas pedal value PV of the vehicle is subjected to low-pass filtering in order to obtain a smoothed gas pedal value PV'. This increases the availability of the on-board diagnostic function in the case of a dynamic driving mode.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for setting a speed of an internal combustion engine of a vehicle, the method comprising:
    activating an on-board diagnostic function of the vehicle;
    in response to the activating the on-board diagnostic function, performing low-pass filtering of an unfiltered gas pedal signal of the vehicle to obtain a smoothed gas pedal signal, wherein the low-pass filtering of the unfiltered gas pedal signal is performed by a first low-pass filter function when values of the unfiltered gas pedal signal are decreasing and by a second low-pass filter function when values of the unfiltered gas pedal signal are increasing;
    generating, based on the smoothed gas pedal signal, a control signal configured to control the internal combustion engine; and
    setting, using the control signal, the speed of the internal combustion engine.

2. The method as claimed in claim 1, wherein values of the unfiltered gas pedal signal are determined to be increasing when a gradient of the unfiltered gas pedal signal has a positive sign, wherein low-pass filtering is carried out by the first low-pass filter function when the gradient of the unfiltered gas pedal signal does not have a positive sign, wherein the first low-pass filter function effects greater smoothing of the unfiltered gas pedal signal than does the second low-pass filter function.

3. The method as claimed in claim 1, further comprising providing the unfiltered gas pedal signal or the smoothed gas pedal signal as an input to a compression function, wherein the compression function is configured to compress the unfiltered gas pedal signal or the smoothed gas pedal signal to provide a compressed unfiltered gas pedal signal or a compressed smoothed gas pedal signal.

4. The method as claimed in claim 1, wherein the activating the on-board diagnostic function of the vehicle is performed in response to determining that a value of the unfiltered gas pedal signal lies within a predefined value range and/or in response to expiry of a predefined period of time after a last activation of the on-board diagnostic function.

5. The method as claimed in claim 1, further comprising deactivating the on-board diagnostic function and, after deactivation of the on-board diagnostic function, generating, based on the smoothed gas pedal signal, the control signal configured to control the internal combustion engine until a first time, generating, based on the smoothed gas pedal signal, the control signal configured to control the internal combustion engine after a second time, and generating, based on a transfer function, the control signal configured to control the internal combustion engine in a time range between the first time and the second time.

6. The method as claimed in claim 5, wherein the transfer function is a linear function.

7. The method as claimed in claim 1, wherein the on-board diagnostic function is a catalytic converter diagnostic function or a cylinder imbalance diagnostic function or a tank venting valve diagnostic function or a variable valve stroke diagnostic function or a lambda adaptation diagnostic function.

8. A vehicle comprising an engine and being configured to perform the method of claim 1.

9. A method for setting a speed of an internal combustion engine of a vehicle, the method comprising:
    activating, in response to determining that a value of an unfiltered gas pedal signal lies within a predefined value range and/or in response to expiry of a predefined period of time after a last activation of an on-board diagnostic function, the on-board diagnostic function of the vehicle;
    in response to the activating the on-board diagnostic function, performing low-pass filtering of the unfiltered gas pedal signal of the vehicle to obtain a smoothed gas pedal signal; and
    generating, based on the smoothed gas pedal signal, a control signal configured to control the internal combustion engine; and
    setting, using the control signal, the speed of the internal combustion engine.

10. The method as claimed in claim 9, further comprising deactivating the on-board diagnostic function and, after deactivation of the on-board diagnostic function, generating, based on the smoothed gas pedal signal, the control signal configured to control the internal combustion engine until a first time, generating, based on the smoothed gas pedal signal, the control signal configured to control the internal combustion engine after a second time, and generating, based on a transfer function, the control signal configured to control the internal combustion engine in a time range between the first time and the second time.

11. The method as claimed in claim 10, wherein the transfer function is a linear function.

12. A vehicle comprising an engine and being configured to perform the method of claim 9.

13. A method for setting a speed of an engine of a vehicle, the method comprising:
   activating an on-board diagnostic function of the vehicle;
   in response to the activating the on-board diagnostic function, performing low-pass filtering of an unfiltered pedal signal of the vehicle to obtain a smoothed pedal signal, wherein the low-pass filtering of the unfiltered pedal signal is performed by a first low-pass filter function when values of the unfiltered pedal signal are decreasing and by a second low-pass filter function when values of the unfiltered pedal signal are increasing; and
   generating, based on the smoothed gas pedal signal, a control signal configured to control the engine; and
   setting, using the control signal, the speed of the engine.

14. A vehicle comprising an engine and being configured to perform the method of claim 13.

* * * * *